(12) United States Patent
Dubon et al.

(10) Patent No.: US 8,613,572 B2
(45) Date of Patent: Dec. 24, 2013

(54) SELF-VENTING CHEMICAL ANCHORING ASSEMBLY WITH SPLASH GUARD

(75) Inventors: William Dubon, Bloomingdale, IL (US); Robert L. Turck, Highland Park, IL (US); Owen J. McGarel, Naperville, IL (US); Andrew J. Rourke, Batavia, IL (US); Deepak H. Mehta, Naperville, IL (US); Jeffrey M. Stupar, West Dundee, IL (US); Stanley J. Cabaj, Park Ridge, IL (US); Robert G. Kobetsky, Chicago, IL (US); John R. Wolfe, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 284 days.

(21) Appl. No.: 13/038,985

(22) Filed: Mar. 2, 2011

(65) Prior Publication Data

US 2011/0222969 A1     Sep. 15, 2011

Related U.S. Application Data

(60) Provisional application No. 61/312,033, filed on Mar. 9, 2010.

(51) Int. Cl.
*E21D 20/00* (2006.01)

(52) U.S. Cl.
USPC .................. 405/259.5; 405/259.1; 405/259.6

(58) Field of Classification Search
USPC ........ 405/258.1, 259.1, 259.5, 259.6; 411/82, 411/82.1; 52/704, 707, 745.21
See application file for complete search history.

(56) References Cited

U.S. PATENT DOCUMENTS

| | | | |
|---|---|---|---|
| 3,756,388 A | 9/1973 | Murphy | |
| 4,664,561 A | 5/1987 | Frease | |
| 4,679,966 A | 7/1987 | Yacisin | |
| 5,249,899 A * | 10/1993 | Wilson | 411/82 |
| 5,282,697 A * | 2/1994 | Maechtle | 405/259.6 |
| 5,282,698 A | 2/1994 | Wright et al. | |
| 5,436,396 A | 7/1995 | Bailey et al. | |
| RE35,659 E * | 11/1997 | Ernst et al. | 411/82 |
| 5,965,635 A | 10/1999 | Rancich et al. | |
| 6,228,207 B1 | 5/2001 | Rancich et al. | |
| 6,291,555 B1 | 9/2001 | Surjan et al. | |
| 6,402,434 B1 | 6/2002 | Surjan et al. | |
| 6,403,678 B1 | 6/2002 | Surjan et al. | |
| 6,416,256 B1 | 7/2002 | Surjan et al. | |
| 6,420,458 B1 | 7/2002 | Surjan et al. | |
| 6,468,010 B2 * | 10/2002 | Sager et al. | 411/82 |
| 6,546,949 B1 | 4/2003 | Gilmore | |
| 6,822,017 B2 | 11/2004 | Kish et al. | |
| 6,837,018 B1 * | 1/2005 | Hagel et al. | 52/698 |
| 7,163,971 B2 | 1/2007 | Rancich et al. | |
| 7,226,650 B2 | 6/2007 | Liu et al. | |
| 7,368,170 B2 | 5/2008 | Liu et al. | |
| 7,374,370 B2 | 5/2008 | Morris | |
| 7,404,274 B2 * | 7/2008 | Hayes | 52/513 |
| 7,411,010 B2 | 8/2008 | Kish et al. | |
| 7,708,500 B2 * | 5/2010 | Buquet et al. | 405/259.6 |
| 2006/0133908 A1 | 6/2006 | Kunz et al. | |
| 2010/0115882 A1 * | 5/2010 | Seroiszka et al. | 52/787.1 |

* cited by examiner

*Primary Examiner* — Sean Andrish
(74) *Attorney, Agent, or Firm* — Pauley Petersen & Erickson

(57) ABSTRACT

A chemical anchoring assembly useful for fast application of a driving tool into a borehole includes an elongated tube having a first end and a second end, a quantity of chemical anchoring material within the elongated tube, and a vent at the second end of the elongated tube. As an anchor pin is driven through the elongated tube and into the borehole, forcing the chemical anchoring material into the borehole, some of the pressure caused by compression of the chemical anchoring material is released into the vent, allowing easier driving of the anchor pin.

21 Claims, 4 Drawing Sheets

SELF-VENTING CHEMICAL ANCHORING ASSEMBLY WITH SPLASH GUARD

FIELD OF THE INVENTION

This invention is directed to a self-venting chemical anchoring assembly that greatly reduces the time required to drive an anchor pin into a borehole.

BACKGROUND OF THE INVENTION

Chemical anchoring adhesives are used to maintain anchor pins in boreholes that are upside down and vertical, or horizontal, or oriented at any angle. The anchoring adhesives and anchor pins are useful in industrial or commercial construction applications such as bridges, airports, highways, skyscrapers, stadiums and tunnels. In a typical application, a borehole is drilled into a substrate member formed of concrete, steel, wood, or a combination thereof, or another material. Then, the interior of the borehole is cleaned and scrubbed to remove dust and dirt particles. Then, the borehole is filled with a measured amount of anchoring adhesive. Then, a driving tool is used to drive an anchor pin into the borehole.

A typical anchor pin is elongated and made of steel. The anchor pin may be threaded or non-threaded and may have a flat or pointed end. The driving tool may be a hammer, or may be a power tool that employs hammering and/or rotational motion.

Chemical anchoring adhesives and methods of applying them are disclosed in U.S. Pat. No. 6,291,555, issued to Surjan et al.; U.S. Pat. No. 6,402,434, issued to Surjan et al.; U.S. Pat. No. 6,403,678, issued to Surjan et al.; U.S. Pat. No. 6,416,256, issued to Surjan et al.; U.S. Pat. No. 6,420,458, issued to Surjan et al.; U.S. Pat. No. 7,226,650, issued to Liu et al.; and U.S. Pat. No. 7,368,170, issued to Liu et al. These patents are incorporated herein by reference in their entireties.

Additional chemical anchoring adhesives and methods of applying them are disclosed in U.S. Pat. No. 7,411,010, issued to Kish et al.; U.S. Pat. No. 7,163,971, issued to Rancich et al.; U.S. Pat. No. 6,822,017, issued to Kish et al.; U.S. Pat. No. 6,228,207, issued to Rancich et al. and U.S. Pat. No. 5,965,635, issued to Rancich et al. These patents are incorporated herein by reference in their entireties.

One challenge faced when applying anchor pins using chemical anchoring adhesives is pressure buildup in the borehole as the anchor pin is driven further into the borehole. The compression of chemical anchoring adhesive by the anchor pin causes pressure build-up, resulting in excessive time and energy needed to drive the anchor pin into the borehole. While the anchor pin may ultimately be driven to the desired depth within the borehole, driving times of 2-3 minutes for one anchor pin are not uncommon.

Due to cost pressures in the construction industries, there is a need or desire for faster, more cost efficient-techniques of driving anchor pins into boreholes using chemical anchoring adhesives. There is also a need or desire for anchoring adhesive assemblies that facilitate this objective.

SUMMARY OF THE INVENTION

The present invention is directed to a self-venting chemical anchoring assembly that reduces the time needed to drive an anchor pin by an order of magnitude. When a hammer is used as the driving tool, the driving time can be reduced from a few minutes to a few seconds. The amount of energy required to drive the anchor pin is correspondingly reduced. The time needed to clean the borehole prior to driving the anchor pin is also reduced, as explained below.

The chemical anchoring assembly includes an elongated tube having a first end and a second end, a quantity of chemical anchoring material within the tube, and a vent at the second end of the tube. The vent includes an upper wall surrounding the tube that serves as a splash guard, a lower floor surrounding the tube, one or more vent openings in the lower floor adjacent to the tube, and a plurality of upright walls between the upper wall and the floor that divide the vent into a plurality of sections.

During use, the chemical anchoring assembly is positioned with the second end of the tube directly over a borehole. A driving pin is positioned at the first end of the tube and is hammered or otherwise driven through the tube, pushing the chemical anchoring material through the second end of the tube into the borehole. The driving pin enters the borehole and is driven downward to a desired depth, causing compression of the chemical anchoring material. Some of the chemical anchoring material fills the space between the driving pin and inner wall of the borehole.

As the chemical anchoring material is compressed, some of it escapes the borehole through the openings in the floor of the vent and enters the vent, allowing pressure release within the borehole. The release of pressure also expels dust from the borehole, eliminating the need for brush cleaning after the borehole is drilled and before the anchor pin is installed. The release of pressure also helps mix the ingredients of the chemical anchoring material. The top wall of the vent serves as a splash guard to prevent splashing and splattering of the chemical anchoring material. Moreover, some of the chemical anchoring material that enters the vent forms a seal around the upper lip of the borehole.

With the foregoing in mind, it is a feature and advantage of the invention to provide a chemical anchoring assembly that greatly reduces the time and energy needed to drive an anchor pin into a borehole.

It is also a feature and advantage of the invention to provide a method of driving an anchor pin into a borehole that greatly reduces the driving time and energy and prolongs the useful life of the chemical anchoring material in the borehole.

The foregoing and other features and advantages will become further apparent from the following detailed description of the invention, read in conjunction with the accompanying drawings. The detailed description and drawings are illustrative rather than limiting, with the scope of the invention being defined by the appended claims.

DETAILED DESCRIPTION OF THE INVENTION

Figure 2:
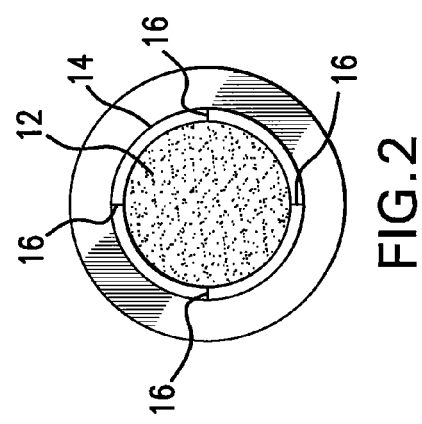
FIG. 2 is a top view of the chemical anchoring assembly of FIG. 1 with the top foil removed.
Figure 3:
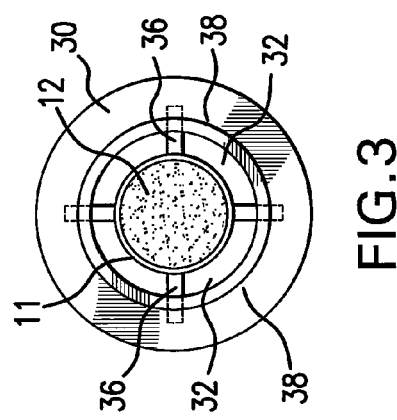
FIG. 3 is a bottom view of the chemical anchoring assembly of FIG. 1 with the bottom foil removed.
Figure 1:
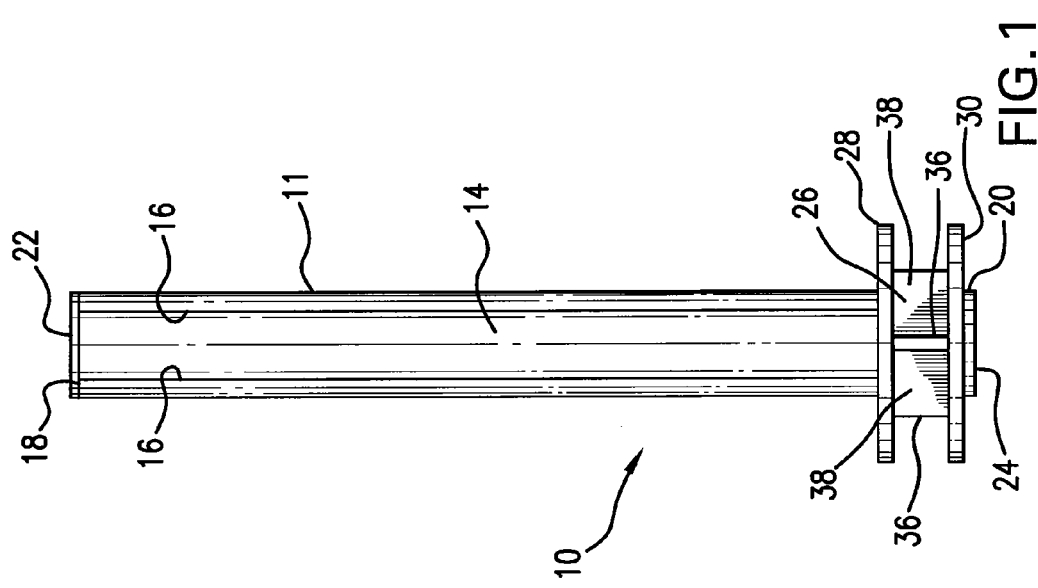
FIG. 1 is a front view of a chemical anchoring assembly of the invention.

Referring to FIGS. 1-3, a chemical anchoring assembly 10 includes an elongated tube 11 and a quantity of chemical anchoring material 12 contained within the elongated tube. The elongated tube 11 includes a cylindrical wall 14 formed of a suitable high strength plastic material such as a polyamide or polyester, and has a first end 18 and a second end 20. A first seal 22 and a second seal 24, suitably made of foil or a thin plastic material, can be provided at the first and second ends, respectively, of the elongated tube 11 for containing and sealing the chemical anchoring material 12 within the elongated tube 11.

A plurality of longitudinally extending slits 16 are provided in the wall 14 of the elongated tube 11. The longitudinally extending slits 16 may commence at or near the first end 18 of the elongated tube 11 and may extend a portion of the distance, suitably at least about half of the distance, or at least about three quarters of the distance, between the first end 18 and the second end 20 of the elongated tube 11. The number of longitudinally extending slits 16 in the wall 14 may be two, three, four, or any suitable number. FIGS. 1 and 2 illustrate four longitudinally extending slits 16 in the wall 14 of elongated tube 11.

A vent 26 is located at the second end 20 of the elongated tube 11. The vent 26 includes a top wall 28 which may surround the elongated tube 11 and may serve as a splash guard for chemical anchoring material that enters the vent. The vent 26 also includes a bottom floor 30 which may surround the elongated tube 11 and may include one or more vent openings 32 adjacent to the elongated tube 11. A plurality of upright walls 36 extend between the top wall 28 and the bottom floor 30 and divide the vent 26 into a plurality of sections or compartments 38. The number of upright walls 36 and the corresponding number of compartments 38 may be two, three, four, or any suitable number. In the embodiment shown in FIG. 3, four upright walls 36 divide the vent 26 into four compartments 38. Each compartment 38 includes at least one vent opening 32 in the bottom floor 30 of the vent. The vent openings 32 are located in the bottom floor 30 and adjacent to the elongated tube 11.

The chemical anchoring material 12 may be in the form of a slug or package of acrylic-based chemical anchoring adhesive. Examples of acrylic-based chemical anchoring adhesives are disclosed in the aforementioned patents to Kish et al. and Rancich et al., which are incorporated by reference. Broadly stated, these adhesives may include about 10-90% by weight of a methacrylic copolymer and about 10-90% by weight of a reinforcement filler. In one example, the acrylic-based chemical anchoring adhesive includes a copolymer of alkylacrylate ester and methacrylic ester monomers, about 10-90% by weight of an inorganic particulate filler, about 0.5-10% by weight of a free radical catalyst, about 0.1-5% by weight of a chain transfer agent, and about 0.01-10% by weight of an activator. In another example, the acrylic-based chemical anchoring adhesive includes an alkylacrylate ester monomer, a copolymer of alkylacrylate ester and methacrylic acid monomers, a filler, a free radical catalyst and up to about 0.5% by weight of a promoter comprising an organic salt of a transition metal. The adhesive may include two compositions which are ultimately mixed together, for instance a first part including a methacrylic ester monomer, a methacrylate ester/methacrylic acid copolymer and a filler, and a second part including a free radical catalyst.

The chemical anchoring material 12 may be in the form of a highly viscous slug or packaged slug of epoxy-based chemical anchoring adhesive. Broadly stated, these adhesives may include about 30-65% by weight of an epoxy resin and about 30-65% by weight of a reinforcement filler. Examples of highly viscous chemical anchoring adhesives are disclosed in the aforementioned patents to Surjan et al., which are incorporated by reference. These patents disclose a rope or slug of adhesive having first and second parts joined directly to each other along an interface. The first part includes a resin, and the second part includes a curing agent. Each of the first and second parts may have a viscosity of about 5 million to about 50 million centipoise. Specifically, the first part may include about 20-45% by weight of an epoxy resin, about 10-40% by weight of a first particulate filler having an oil absorption value of at least about 30, and about 40-65% by weight of second particulate filler, where at least about 70% by weight of the second particulate filler has a U.S. Sieve size between 16 and 45, inclusive. The second part may include about 5-20% by weight of an aliphatic amine compound, about 0.1-15% by weight of a tertiary amine compound, about 1-23% by weight of a first particulate filler having an oil absorption value of at least about 30, and about 52-87% by weight of a second particulate filler, where at least about 70% by weight of the second particulate filler has a U.S. Sieve size between about 16 and 45.

Examples of somewhat less viscous chemical anchoring adhesives that can be wrapped in a film wrapper to form a package are disclosed in the aforementioned patents to Liu et al, which are incorporated by reference. Again, first and second parts of chemical anchoring adhesive are joined along an interface. Each part has a viscosity of about 200,000 to about 4 million centipoise. The first part can include about 28-40% by weight of an epoxy resin, about 50-75% by weight sand, and about 2-6% by weight fumed silica. The second part includes at least a curing agent and can include about 5-25% by weight of an aliphatic amine compound, about 0.1-15% by weight of a tertiary amine compound, about 60-90% by weight sand and about 0.1-10% by weight fumed silica.

The slug or package of chemical anchoring material 12 is not limited to the foregoing compositions. Other compositions of chemical anchoring material, including liquid adhesive contained in a package, are also within the scope of the invention. In all instances, the slug or package of chemical anchoring material 12 is contained within the cylindrical tube 11 prior to being applied to the interior of a borehole.

Figures 4, 5:
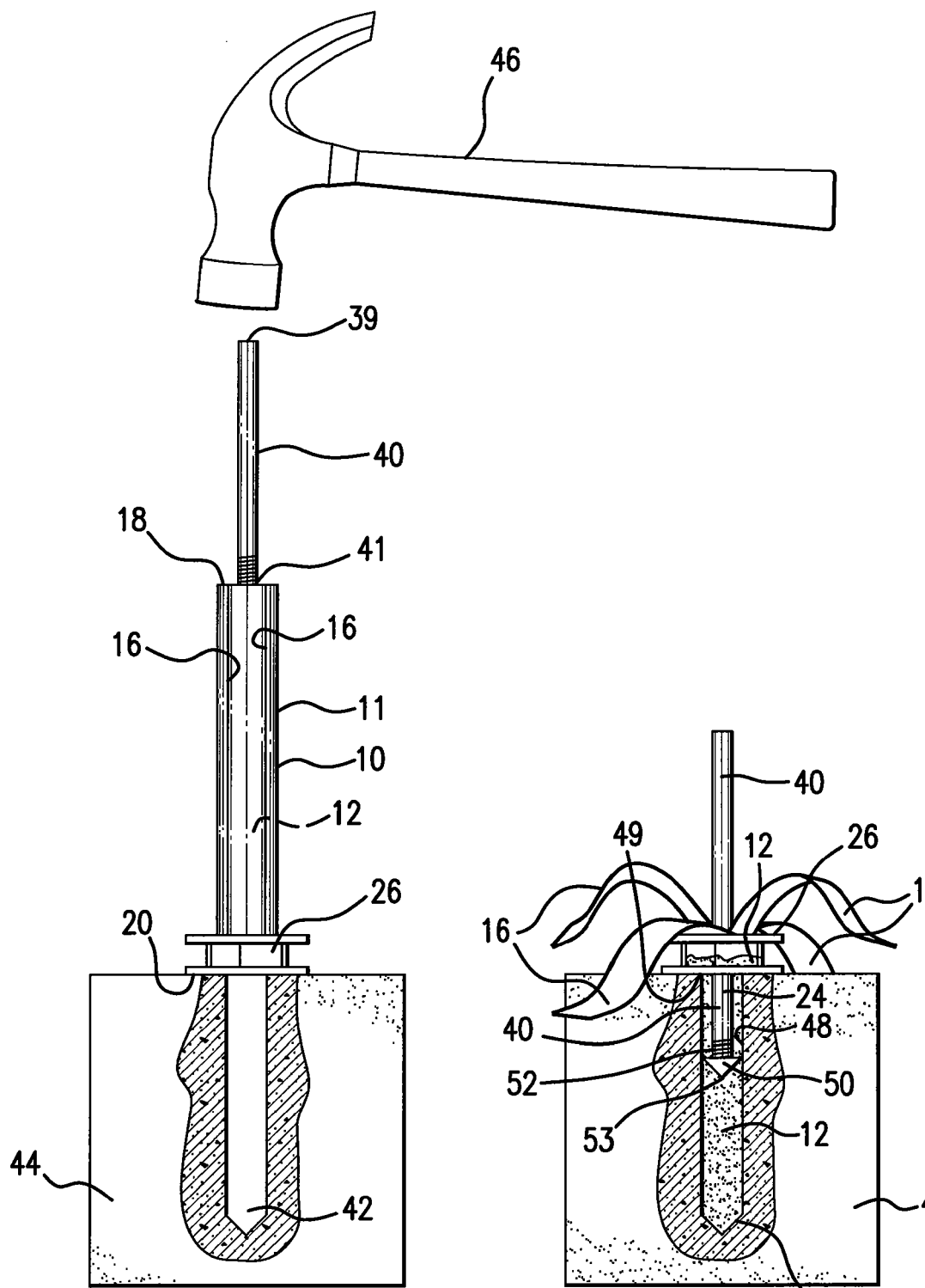
FIGS. 4 and 5 schematically illustrate a method of driving an anchor pin into a borehole using the chemical anchoring assembly of the invention.

FIGS. 4 and 5 schematically illustrate a method of driving an anchor pin 40 having a first end 39 and a second end 41 into a borehole 42 of a concrete block or other substrate 44. The method includes the step of providing a chemical anchoring assembly 10 including an elongated tube 11 having a first end 18 and a second end 20, a quantity of chemical anchoring material 12 within the elongated tube 11, and a vent 26 at the second end 20 of the tube 11. The chemical anchoring assembly 10 is positioned with the second end of the elongated tube 11 directly over the borehole 42. The anchor pin 40 is positioned with its second end 41 adjacent to the first end 18 of the elongated tube 11.

A driving tool, such as hammer 46 shown in FIG. 4, is applied to the first end 39 of the anchor pin 40 to drive the anchor pin 40 through the elongated tube 11 and into the borehole 42, thereby forcing the chemical anchoring material 12 into the borehole 42 as shown in FIG. 5. As the anchor pin 40 is driven through the elongated tube 11, the elongated tube 11 is parted along the longitudinally extending slits 16 described above, thereby making it easier to drive the anchor pin 40 through the elongated tube 11 and into the borehole 42.

As shown in FIG. 4, second end 41 of anchor pin 40 may be threaded. As shown in FIG. 5, the chemical anchoring assembly 10 may be provided with a penetrator 50 having an internally threaded opening that engages the second end 41 of anchor pin 40, an externally threaded surface 52, and a pointed end 53. The penetrator 50 may be internally provided near the first end 18 of chemical anchoring assembly 10. When anchor pin 40 is connected to penetrator 50 and driven, the pointed end 53 penetrates the slug or package of chemical anchoring material 12. As the anchor pin 40 is driven into borehole 42, the threaded surface 52 of penetrator 50 removes loose material from the inner wall 48 of the borehole 42 and helps to firmly anchor the anchor pin 40 within the borehole 42.

As the anchor pin 40 enters the borehole 42, the chemical anchoring material 12 is mixed and compressed, causing chemical reaction between the components of the chemical anchoring material. As the second end 41 of anchor pin 40 moves toward the bottom of the borehole 42, some of the chemical anchoring material fills the interstitial space between the anchor pin 40 and the inner wall 48 of borehole 42. As the pressure increases inside the borehole 42, some of the chemical anchoring material 12 is released from the borehole 42 into the vent 26, thereby facilitating pressure release in the borehole 42 and easier driving of the anchor pin 40. The parting of the elongated tube 11 along slits 16, together with the pressure release from borehole 42 into vent 26, greatly reduces the time and energy needed to drive the anchor pin 40 into the borehole 42. The pressure release also assists in mixing the components of the chemical anchoring material 12 inside the borehole 42.

As explained above with respect to FIGS. 1-3, the vent 26 includes an upper wall 28, a lower floor 30, vent openings 32 in the lower floor 30, and a plurality of upright walls 36 that extend between the upper wall 28 and lower floor 30 and divide the vent 26 into sections or compartments 38. The step of releasing some of the chemical anchoring material 12 into the vent 26 includes passing the chemical anchoring material 12 through the vent openings 32, whereupon the upper wall 28 serves as a splash guard. The chemical anchoring material 12 that enters the vent 26 helps form a seal around an upper lip 49 of borehole 42 along with vent 26. The seal helps keep oxygen out of the borehole and prolongs the useful life of the installed anchor pin 40 by preventing oxidation of the chemical anchoring material 12 inside the borehole 42.

Figure 6:
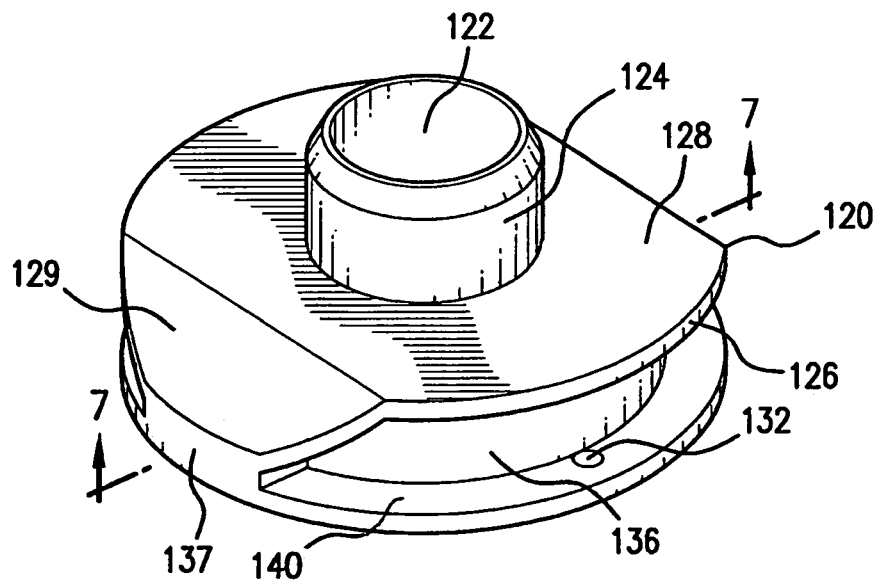
FIG. 6 is a perspective view of an alternative embodiment of a vent assembly useful in the chemical anchoring assembly of the invention.
Figure 7:
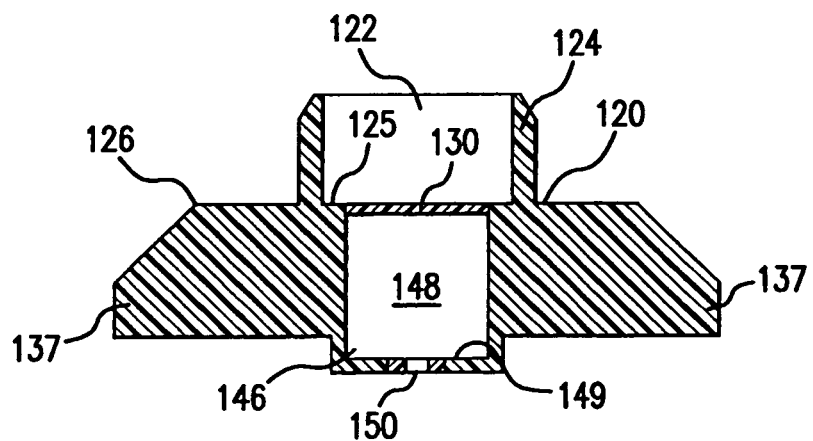
FIG. 7 is a sectional view of the vent assembly taken along the line 7-7 in FIG. 6.

In an alternative embodiment, the vent can be included as part of a vent assembly 120, as shown in FIGS. 6 and 7, which includes various advantageous features. While these advantageous features are described with respect to a single embodiment of vent assembly 120, it should be understood that some or all of the advantageous features of vent assembly 120 can be incorporated into vent 26. The illustrated vent assembly 120 includes an outer vent 126 surrounding and defining a mixing cup 146.

Figure 10:
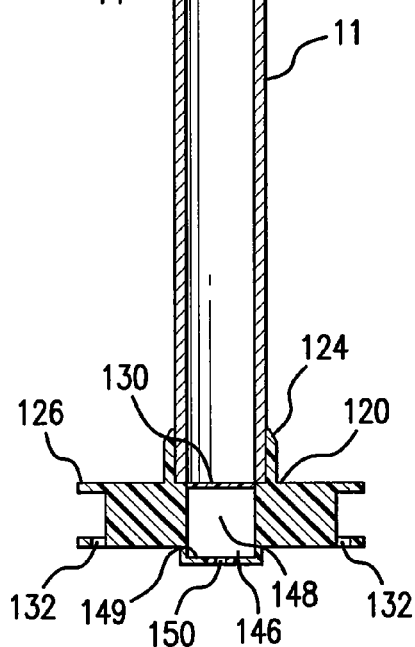
FIG. 10 is a partial cutaway view of a chemical anchoring assembly that employs the vent assembly of FIG. 6 and the sleeve assembly of FIG. 8.

As illustrated in FIGS. 7 and 10, the vent assembly 120 includes an upper receiving portion 122 defined by a circular wall 124 that receives the second end 20 of elongated tube 11. The receiving portion 122 is wider than the mixing cup 146 located below the receiving portion 122, so as to define a flange 125 that engages and secures the wall 14 at the second end 20 of elongated tube 11. The mixing cup 146 includes a cup chamber 148, a cup floor 149, and an outlet 150 in the floor 149 that is substantially narrower in diameter than the cup chamber 148. The mixing cup 146 is initially separated from the receiving portion 122 by a breakable membrane 130, which can be formed of nylon or another suitable material.

When the chemical anchoring material breaks through the second seal 24 at the second end 20 of elongated tube 11, as shown in FIG. 10, the chemical anchoring material enters the mixing cup 146 and experiences initial mixing in cup chamber 148 due to the action of the driving tool. As the pressure builds in the mixing cup 146, the chemical anchoring material is forced through the narrow outlet 150 and into the borehole 42 as a high velocity jet, which results in further mixing in the borehole 42.

The outlet 150 has a diameter that is smaller than the diameter of cup chamber 148, suitably not more than half, or not more than one third, or not more than one fourth of the diameter of cup chamber 148. In one example, the cup chamber may have a diameter of about 0.5 inch and the outlet 150 may have a diameter of about 0.125 inch. The cup floor 149 is strong enough and thick enough so that it does not rupture as the chemical anchoring material is forced through outlet 150 under pressure and at high velocity. For example, the cup floor 149 can have a thickness of about 0.03 inch to about 0.10 inch or greater, and suitably has a thickness of about 0.04 inch to about 0.08 inch. The material used to form the cup floor 149 can be the same or different as the material used to form the entire vent assembly 120. Suitable materials for the floor 149 and vent assembly 120 include without limitation impact-modified nylon, polypropylene, polycarbonate, polyester, and combinations thereof.

Referring to FIGS. 6 and 7, the outer vent 126 includes a top wall 128 which may surround the receiving portion 122 and/or cup 146 and may serve as a splash guard for chemical anchoring material that enters the vent. The outer vent 126 includes a bottom floor 140 that may surround the cup 146 and may include one or more vent openings 132 passing through the floor 140. The floor 140 may include one, two, three, four, or any suitable number of vent openings 132. By controlling the size of the one or more vent openings 132 as shown, the flow of chemical anchoring material that enters the outer vent 126 through vent openings 32 can be better controlled.

A cylindrical upright wall 136 and two opposing upright walls 137 extend between the top wall 128 and the floor 140. The opposing upright walls 137 join the floor 140 with opposing tapered portions 129 of the top wall 128. The opposing tapered portions 129 can be used as hold-down handles for pressing and holding the vent assembly 120 in place during the driving step.

Figure 8:
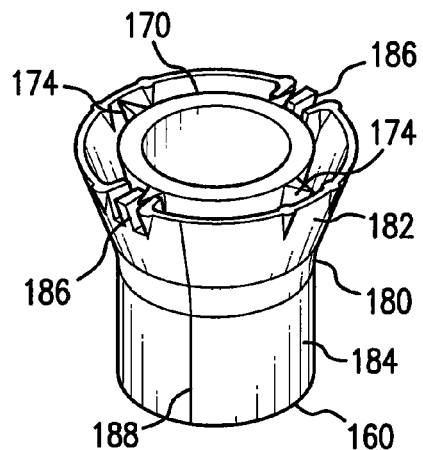
FIG. 8 is a perspective view of a cutting assembly useful in one embodiment of the chemical anchoring assembly.
Figure 9:
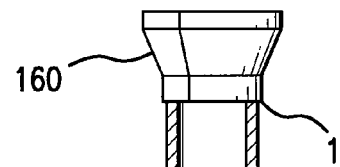
FIG. 9 is a perspective view of a tube cutter used in the sleeve assembly of FIG. 8.
Figure 9:
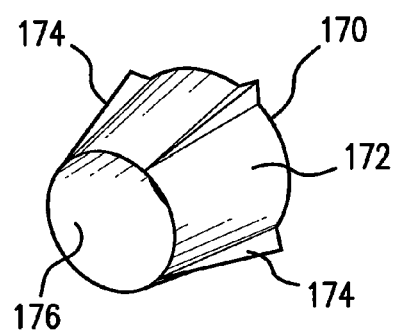

Referring to FIGS. 8-10, a cutting assembly 160 can be installed at the first end 18 of elongated tube 11 and can, when used, eliminate the need for longitudinally extending slits 16 in the wall 14 of elongated tube 11. The sleeve assembly 160 includes a tube cutter 170 mounted in an outer sleeve 180.

The tube cutter 170 includes a semi-conical wall 172 and a plurality of cutting blades 174 mounted to or formed integrally with the semi-conical wall 172 and extending outward from the semi-conical wall 172. The illustrated tube cutter 170 has four cutting blades 174. In other embodiments, the number of cutting blades 174 can be two, three, five, six, or any suitable number. The cutting blades 174 should be evenly spaced around the semi-conical wall 172. The tube cutter 170 can be formed of metal such as steel or aluminum, or a rigid plastic such as polycarbonate, polyester or filled nylon.

The outer sleeve 180 is sized and fitted to receive the tube cutter 170, suitably in a snap-in manner. The outer sleeve 180 includes an upper semi-conical portion 182 for holding the tube cutter 170, and a lower cylindrical portion 184 for engaging, and suitably receiving and fitting over, the first end 18 of elongated tube 11. The outer sleeve 180 includes a plurality of notches or channels 186 for receiving at least some of the cutting blades 174, suitably in a snap-in manner. The outer sleeve 180 may also include one or more longitudinally extending slits 188 that facilitate breakage of the sleeve 180 when an anchor pin is driven.

When an anchor pin 40 is driven in a manner similar to that described above with respect to FIGS. 4 and 5, the second end 41 of the anchor pin 40 engages and temporarily locks into the inner surface 176 of the tube cutter 170. As the anchor pin 40 is driven using a driving tool 46, the tube cutter is first pushed down through the sleeve 180, causing it to break away. Then, the anchor pin 40 pushes the tube cutter 170 down through the elongated tube 11, causing cutting and splitting of the wall 14 of tube 11. As the anchor pin 40 is driven into the borehole 42, the tube cutter 170 lodges in the cup 146 of the vent assembly 126.

As explained above with respect to FIG. 1, the first and second seals 22 and 24, at the first and second ends 18 and 20 of longitudinal tube 11, can be made of foil or thin plastic. In one embodiment, the seals 22 and 24 are each formed of a three-layer laminate of support material/foil/heat seal material. The support material can be nylon, polyethylene, polypropylene, or another suitable plastic. The foil can be aluminum or tin. The heat seal material can be ethylene vinyl acetate, ethylene methyl acrylate, ionomer, or another suitable material.

The embodiments of the invention described herein are exemplary. Various modifications and improvements can be made without departing from the sprit and scope of the invention. The scope of the invention is indicated by the appended claims, and all changes that fall within the meaning and range of equivalents are intended to be embraced therein.

We claim:

1. A method of driving an anchor pin having a first end and a second end into a borehole, comprising the steps of:
    providing a chemical anchoring assembly including an elongated tube having a first end and a second end, a quantity of chemical anchoring material within the elongated tube, and a vent assembly at the second end of the tube including a vent and a cup;
    positioning the chemical anchoring assembly with the second end of the elongated tube directly over the borehole;
    positioning the anchor pin with the second end of the anchor pin adjacent to the first end of the elongated tube;
    driving the anchor pin through the elongated tube and into the borehole by applying a driving tool to the first end of the anchor pin, thereby forcing the chemical anchoring material into the borehole; and
    releasing some of the chemical anchoring material from the borehole into the vent as the anchor pin is driven into the borehole;
    the vent including an upper wall, a lower floor, vent openings in the lower floor, and a plurality of upright walls between the upper wall and the lower floor that divide the vent into sections, each section including at least one of the vent openings in the lower floor; and
    the cup including a chamber, a cup floor, and an outlet in the cup floor having a diameter that is smaller than a diameter of the chamber.

2. The method of claim 1, wherein the method further comprises the step of mixing the chemical anchoring material by injecting the chemical anchoring material at high velocity through the outlet and into the borehole.

3. The method of claim 2, wherein the elongated tube further comprises a plurality of longitudinally extending slits commencing at the first end of the elongated tube and terminating between the first end and the second end of the elongated tube.

4. The method of claim 2, further comprising a cutting assembly at the first end of the elongated tube, the cutting assembly including at least a tube cutter.

5. The method of claim 2, wherein the chemical anchoring material comprises two compositions, further comprising the step of mixing the two compositions together as the anchor pin is driven into the borehole.

6. The method of claim 5, wherein the two compositions are mixed together in the cup.

7. The method of claim 2, wherein the chemical anchoring material comprises about 10-90% by weight of a methacrylic copolymer and about 10-90% by weight of a reinforcement filler.

8. The method of claim 2, wherein the chemical anchoring material comprises about 30-65% by weight of an epoxy resin and about 30-65% by weight of a reinforcement filler.

9. The method of claim 2, wherein the vent comprises two to four of the sections.

10. The method of claim 2, wherein the upper wall of the vent surrounds the elongated tube and serves as a splashguard, the lower floor of the vent surrounds the elongated tube, and the one or more openings in the lower floor are adjacent to the elongated tube.

11. The method of claim 2, wherein the chemical anchoring assembly further comprises a first seal at a first end of the elongated tube and a second seal at the second end of the elongated tube.

12. The method of claim 1, wherein the step of releasing some of the chemical anchoring material from the borehole comprises passing the chemical anchoring material through the vent openings.

13. The method of claim 12, further comprising the step of employing the upper wall of the vent as a splash guard for chemical anchoring material that is released into the vent.

14. The method of claim 1, further comprising the step of forming a seal around an upper lip of the borehole using chemical anchoring material that is released into the vent.

15. The method of claim 1, further comprising the step of mixing components of the chemical anchoring material within the borehole as some of the chemical anchoring material is released from the borehole into the vent.

16. A chemical anchoring assembly, comprising:
    an elongated tube having a first end and a second end;
    a quantity of chemical anchoring material within the elongated tube; and
    a vent assembly at the second end of the elongated tube, the vent assembly including a vent and an inner cup, the vent including a lower floor and one or more vent openings in the lower floor;
    the inner cup including a chamber, a cup floor, and an outlet in the cup floor having a diameter that is smaller than a diameter of the chamber;
    wherein the vent assembly further comprises a receiving portion for receiving the second end of the elongated tube and a breakable membrane between the receiving portion and the inner cup;
    the vent further comprises an upper wall, and upright walls between the upper wall and lower floor that divide the vent into a plurality of sections, each section having one or more vent openings; and
    the upper wall of the vent surrounds the elongated tube and serves as a splash guard, the lower floor of the vent surrounds the elongated tube, and the vent openings in the lower floor are adjacent to the elongated tube.

17. The chemical anchoring assembly of claim 16, further comprising a first seal at the first end of the tube and a second seal at the second end of the tube.

18. The chemical anchoring assembly of claim 16, wherein the vent comprises two to four of the sections.

19. The chemical anchoring assembly of claim 16, wherein the elongated tube further comprises a plurality of longitudinally extending slits commencing at the first end of the elongated tube and terminating between the first end and the second end of the elongated tube.

20. The chemical anchoring assembly of claim 16, further comprising a cutting assembly at the first end of the elongated tube, the cutting assembly including at least a tube cutter.

21. The chemical anchoring assembly of claim 16, wherein the chemical anchoring material comprises about 10-90% by weight of a methacrylic copolymer and about 10-90% by weight of a reinforcement filler.

* * * * *